United States Patent
Hara et al.

(10) Patent No.: US 11,180,211 B2
(45) Date of Patent: Nov. 23, 2021

(54) BICYCLE TELESCOPIC APPARATUS

(71) Applicant: Shimano Inc., Sakai (JP)

(72) Inventors: Nobukatsu Hara, Sakai (JP); Satoshi Shahana, Sakai (JP); Toyoto Shirai, Sakai (JP); Yuki Sakagawa, Sakai (JP); Yuta Kurokawa, Sakai (JP)

(73) Assignee: Shimano Inc., Sakai (JP)

(*) Notice: Subject to any disclaimer, the term of this patent is extended or adjusted under 35 U.S.C. 154(b) by 263 days.

(21) Appl. No.: 15/856,003

(22) Filed: Dec. 27, 2017

(65) Prior Publication Data

US 2019/0193800 A1   Jun. 27, 2019

(51) Int. Cl.
| | |
|---|---|
| *B62J 1/06* | (2006.01) |
| *B62K 19/36* | (2006.01) |
| *B62J 1/10* | (2006.01) |
| *B62J 99/00* | (2020.01) |
| *B62J 1/08* | (2006.01) |
| *B62J 45/00* | (2020.01) |

(Continued)

(52) U.S. Cl.
CPC . *B62J 1/06* (2013.01); *B62J 1/10* (2013.01); *B62J 99/00* (2013.01); *B62K 19/36* (2013.01); *B62J 45/00* (2020.02); *B62J 45/20* (2020.02); *B62J 45/40* (2020.02); *B62J 2001/085* (2013.01)

(58) Field of Classification Search
CPC ....... B62J 1/06; B62J 1/10; B62J 99/00; B62J 2001/085; B62J 2099/0013; B62J 2099/004; B62J 2099/002; B62K 19/36
See application file for complete search history.

(56) References Cited

U.S. PATENT DOCUMENTS

| | | | | |
|---|---|---|---|---|
| 8,091,910 B2* | 1/2012 | Hara | ...... | B62K 25/04 |
| | | | | 280/283 |
| 9,422,018 B2* | 8/2016 | Pelot | ...... | G05D 7/0635 |

(Continued)

FOREIGN PATENT DOCUMENTS

| | | |
|---|---|---|
| DE | 102010044229 A1 | 4/2011 |
| EP | 2865586 A1 | 4/2015 |
| TW | 201713539 A | 4/2017 |

OTHER PUBLICATIONS

Komatsu. A., "Bicycle Control System," Application as Filed in U.S. Appl. No. 15/641,855, filed Jul. 5, 2017, 29 pages.

*Primary Examiner* — Behrang Badii
*Assistant Examiner* — Daniel L Greene
(74) *Attorney, Agent, or Firm* — Alleman Hall Creasman & Tuttle LLP (57) ABSTRACT

A bicycle telescopic apparatus includes a first tube, a second tube, a positioning structure, a memory, and a controller. The second tube is telescopically received in the first tube and configured to be adjustably movable with respect to the first tube in a longitudinal direction of the bicycle telescopic apparatus. The positioning structure includes an electrical actuator to adjustably position the second tube relative to the first tube in the longitudinal direction. The memory is configured to store setting information for a predetermined relative position of the first tube and the second tube, and the setting information is changed via an electrical setting operation. The controller is configured to control the electrical actuator to position the second tube relative to the first tube at the predetermined relative position.

20 Claims, 7 Drawing Sheets

(51) Int. Cl.
    *B62J 45/20*     (2020.01)
    *B62J 45/40*     (2020.01)

(56) References Cited

U.S. PATENT DOCUMENTS

| | | | |
|---|---|---|---|
| 2003/0197504 A1* | 10/2003 | Gray | F15B 15/2861 324/207.24 |
| 2007/0040433 A1* | 2/2007 | Huang | A47C 1/03238 297/325 |
| 2008/0296946 A1* | 12/2008 | Reynolds | B60N 2/525 297/284.6 |
| 2009/0238635 A1* | 9/2009 | Mankadi | B62K 19/36 403/109.3 |
| 2011/0204201 A1* | 8/2011 | Kodama | B62J 1/08 248/406.1 |
| 2012/0274043 A1* | 11/2012 | Lee | B62K 19/36 280/288.4 |
| 2013/0221713 A1* | 8/2013 | Pelot | G05D 7/0635 297/215.13 |
| 2014/0305253 A1* | 10/2014 | Tseng | B62J 1/06 74/502.2 |
| 2015/0180517 A1* | 6/2015 | Abe | G08C 17/00 455/99 |
| 2016/0073786 A1* | 3/2016 | Walker | A47C 7/563 297/325 |
| 2016/0176463 A1* | 6/2016 | McPherson | B62J 1/04 297/215.15 |
| 2016/0280299 A1* | 9/2016 | Hara | B62J 1/28 |
| 2017/0290432 A1* | 10/2017 | Reinhard | A47C 7/14 |
| 2018/0079462 A1* | 3/2018 | Shirai | B62K 25/08 |
| 2018/0319505 A1* | 11/2018 | Von Ballmoos | A47C 27/083 |
| 2018/0334212 A1* | 11/2018 | Bowers | B62J 1/04 |
| 2019/0061852 A1* | 2/2019 | Shirai | B62J 1/08 |

\* cited by examiner

BICYCLE TELESCOPIC APPARATUS

BACKGROUND

When riding a bicycle, and in particular, when riding a mountain bike, it is sometimes desirable to adjust the seat position. For example, when climbing a hill, users often prefer a raised seat position. When descending, users often prefer a lower seat position. The seat position preferred by a user may vary with the terrain. For example, bumpy downhill terrain may call for a lower seat position than smooth downhill terrain. It may be useful for users to adjust seat position while riding, as the slope and terrain change. When adjusting a telescopic seatpost while riding, a user places their weight on the seat to adjust its height, which can be challenging when riding over varied terrain.

SUMMARY

In accordance with a first aspect of the present invention, a bicycle telescopic apparatus comprises a first tube, a second tube, a positioning structure, a memory, and a controller. The second tube is telescopically received in the first tube and configured to be adjustably movable with respect to the first tube in a longitudinal direction of the bicycle telescopic apparatus. The positioning structure includes an electrical actuator to adjustably position the second tube relative to the first tube in the longitudinal direction. The memory is configured to store setting information for a predetermined relative position of the first tube and the second tube, and the setting information is configured to be changed via an electrical setting operation. The controller is configured to control the electrical actuator to position the second tube relative to the first tube at the predetermined relative position.

With the bicycle telescopic apparatus according to the first aspect, it is possible for users to easily change a predetermined height of the bicycle telescopic apparatus via an electrical setting operation as they like.

In accordance with a second aspect of the present invention, the bicycle telescopic apparatus according to the first aspect further comprises a position sensor configured to detect the predetermined relative position of the first tube and the second tube, and the position sensor outputs a signal to position the second tube relative to the first tube at the predetermined relative position to the controller in response to a detection of the predetermined relative position.

With the bicycle telescopic apparatus according to the second aspect, it is possible to automatically position a second tube relative to a first tube when the sensor detects a predetermined relative position during height adjusting operation of a bicycle telescopic apparatus.

In accordance with a third aspect of the present invention, the bicycle telescopic apparatus according to the second aspect is configured in a manner such that the position sensor detects at least two relative positions of the first tube and the second tube, and the controller is configured to set the predetermined relative position from one of the at least two relative positions.

With the bicycle telescopic apparatus according to the third aspect, it is possible to select a predetermined relative position from at least two relative positions of a first tube and a second tube.

In accordance with a fourth aspect of the present invention, the bicycle telescopic apparatus according to the second or third aspect is configured in a manner such that the position sensor is at least partially disposed in one of the first tube and the second tube.

With the bicycle telescopic apparatus according to the fourth aspect, it is possible to protect a position sensor by one of the first and second tubes.

In accordance with a fifth aspect of the present invention, the bicycle telescopic apparatus according to the fourth aspect is configured in a manner such that the position sensor has an elongated shape extending in the longitudinal direction.

With the bicycle telescopic apparatus according to the fifth aspect, it is possible to arrange a position sensor along a longitudinal direction of one of the first and second tubes.

In accordance with a sixth aspect of the present invention, the bicycle telescopic apparatus according to the fourth aspect is configured in a manner such that the position sensor includes a pressure sensor configured to detect a pressure of an air chamber biasing the second tube relative to the first tube in an extending direction.

With the bicycle telescopic apparatus according to the sixth aspect, it is possible to arrange a position sensor in an air chamber of a bicycle telescopic apparatus.

In accordance with a seventh aspect of the present invention, the bicycle telescopic apparatus according to any one of the first to sixth aspects is configured in a manner such that the memory is disposed on one of the first tube, the second tube, and a remote device that is configured to transmit a control signal to the controller to control the positioning structure.

With the bicycle telescopic apparatus according to the seventh aspect, it is possible for users to easily change a predetermined height of the bicycle telescopic apparatus via an electrical setting operation as they like.

In accordance with an eighth aspect of the present invention, the bicycle telescopic apparatus according to the seventh aspect is configured in a manner such that the controller is configured to communicate with the remote device to establish the electrical setting operation.

With the bicycle telescopic apparatus according to the eighth aspect, it is possible to establish the electrical setting operation via a remote device.

In accordance with a ninth aspect of the present invention, the bicycle telescopic apparatus according to the eighth aspect is configured in a manner such that the controller is configured to communicate wirelessly with the remote device.

With the bicycle telescopic apparatus according to the ninth aspect, it is possible to establish the electrical setting operation without using a wired connection between a bicycle telescopic apparatus and a remote device.

In accordance with a tenth aspect of the present invention, the bicycle telescopic apparatus according to any one of the first to ninth aspects is configured in a manner such that the predetermined relative position corresponds to at least one of a maximum length position and a minimum length position of the bicycle telescopic apparatus such that an adjustable length range of the bicycle telescopic apparatus is variable.

With the bicycle telescopic apparatus according to the tenth aspect, it is possible to change an adjustable length range of a bicycle telescopic apparatus in accordance with a user's need or road condition.

In accordance with an eleventh aspect of the present invention, the bicycle telescopic apparatus according to the tenth aspect is configured in a manner such that the maximum length position and the minimum length position are changed via the electrical setting operation.

With the bicycle telescopic apparatus according to the eleventh aspect, it is possible to change an adjustable length range of a bicycle telescopic apparatus in accordance with a user's need or road condition.

In accordance with a twelfth aspect of the present invention, the bicycle telescopic apparatus according to the tenth or eleventh aspect is configured in a manner such that the adjustable length range is greater than or equal to 50 mm and less than or equal to 300 mm.

With the bicycle telescopic apparatus according to the twelfth aspect, it is possible to change an adjustable length range of a bicycle telescopic apparatus in accordance with a user's need or road condition.

In accordance with a thirteenth aspect of the present invention, the bicycle telescopic apparatus according to any one of the first to twelfth aspects is configured in a manner such that the predetermined relative position corresponds to an intermediate length position arranged between a maximum length position and a minimum length position of the bicycle telescopic apparatus.

With the bicycle telescopic apparatus according to the thirteenth aspect, it is possible to accurately position a second tube relative to a first tube to be at a desired intermediate length position while riding a bicycle.

In accordance with a fourteenth aspect of the present invention, the bicycle telescopic apparatus according to the thirteenth aspect is configured in a manner such that the predetermined relative position includes more than two intermediate length positions.

With the bicycle telescopic apparatus according to the fourteenth aspect, it is possible to use different intermediate length positions for different road and riding conditions.

In accordance with a fifteenth aspect of the present invention, the bicycle telescopic apparatus according to the thirteenth or fourteenth aspect is configured in a manner such that the memory is configured to selectably bypass the predetermined relative position that corresponds to the intermediate length position via the electrical setting operation.

With the bicycle telescopic apparatus according to the fifteenth aspect, it is possible to decide not to use an intermediate length position as a predetermined relative position.

In accordance with a sixteenth aspect of the present invention, the bicycle telescopic apparatus according to any one of the thirteenth to fifteenth aspects is configured in a manner such that the controller is configured to bypass the intermediate length position in response to a receipt of an alternate control signal from a remote device.

With the bicycle telescopic apparatus according to the sixteenth aspect, it is possible to ignore an intermediate length while adjusting a height of a bicycle telescopic apparatus by using an alternate control signal.

In accordance with a seventeenth aspect of the present invention, the bicycle telescopic apparatus according to any one of the first to sixteenth aspect is configured in a manner such that the positioning structure includes a hydraulic positioning structure including a valve to open and close a hydraulic passage, and the controller controls the electrical actuator to close the valve at the predetermined relative position.

With the bicycle telescopic apparatus according to the seventeenth aspect, it is possible to position a second tube relative to a first tube by controlling an electrical actuator of a hydraulic positioning structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. The term "small and/or light vehicle," as used herein, refers to electric and non-electric vehicles regardless of the number of their wheels, but does not include four-wheeled vehicles having an internal combustion engine as a power source for driving the wheels, or four-wheeled electric vehicles that require a license to operate on public roads.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

Figure 1:
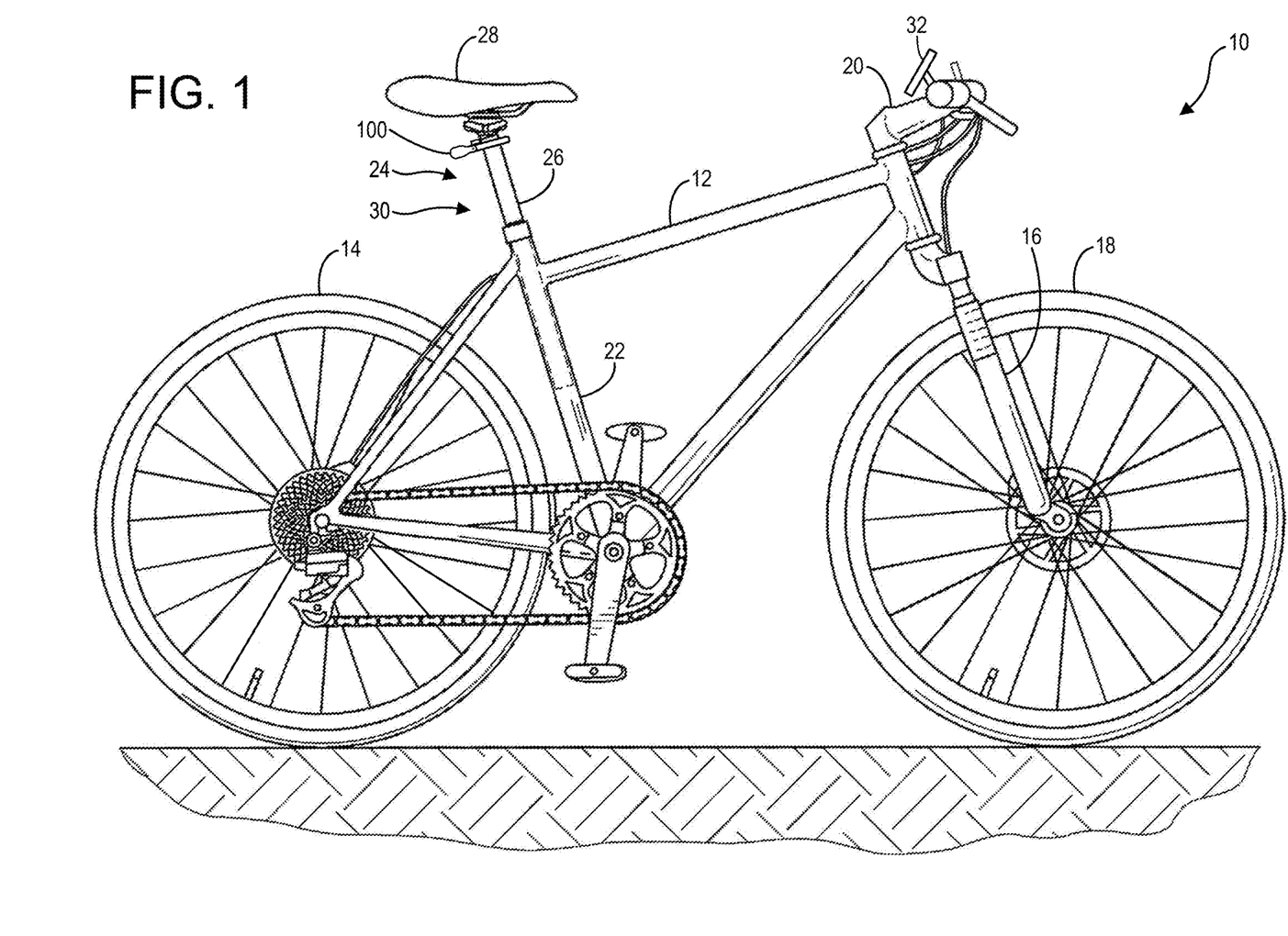
FIG. 1 is a side elevation view of an example bicycle incorporating a bicycle telescopic apparatus according to the present disclosure.

Referring initially to FIG. 1, an exemplary bicycle 10 according to at least one disclosed embodiment of the present invention is shown. The bicycle 10 includes a frame 12 attached to a rear wheel 14. A front fork 16 attaches a front wheel 18 to the frame 12. A handlebar 20 is attached to the frame 12. The frame 12 includes a seat tube 22, which receives a height-adjustable seatpost assembly 24. The height-adjustable seatpost assembly 24 includes a seatpost 26 to which a seat 28 is attached. In the embodiment of FIG. 1, the height-adjustable seatpost assembly 24 is shown as an example of a bicycle telescopic apparatus 30, with the dashed lines indicating the telescopic nature. The bicycle 10 can include a remote device 32 mounted, for example, on the handlebar 20, where it can be manipulated by a user. The remote device 32 controls the bicycle telescopic apparatus 30 and may be configured as a computing device with a touch screen input such as a mobile phone, electronic tablet, trip computer, or the like. In addition or as an alternative to touch screen inputs on the remote device 32, the bicycle 10 may include an electrical switch unit 100 that is mounted to the seatpost 26, for example, to enable the user to toggle the seat position between positions, or fine tune the seat position, as is discussed in detail below. Other parts of the bicycle 10 are well known and are not described herein.

Figure 2:
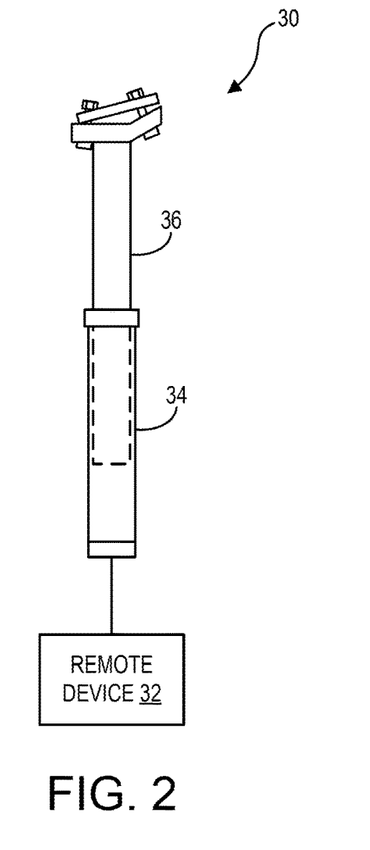
FIG. 2 is a schematic diagram of a bicycle telescopic apparatus according to the present disclosure, incorporated into a height-adjustable seatpost assembly.

As described above, in the embodiment of FIG. 1, the bicycle telescopic apparatus 30 is the height-adjustable seatpost assembly 24. This configuration is further illustrated schematically in FIG. 2, which shows the bicycle telescopic apparatus 30 incorporated into the height-adjustable seatpost assembly 24. The bicycle telescopic apparatus 30 comprises a first tube 34 and a second tube 36, which is telescopically received in the first tube 34. The dashed line of FIG. 2 indicates the portion of the second tube 36 that is within the first tube 34. The telescopic arrangement of the second tube 36 within the first tube 34 allows a user to adjust the length of the bicycle telescopic apparatus 30, and thus the height of the seatpost assembly 24, according to road conditions and/or personal preference. As described in detail below, the length of the bicycle telescopic apparatus 30 may be adjusted via the remote device 32.

Figure 3:
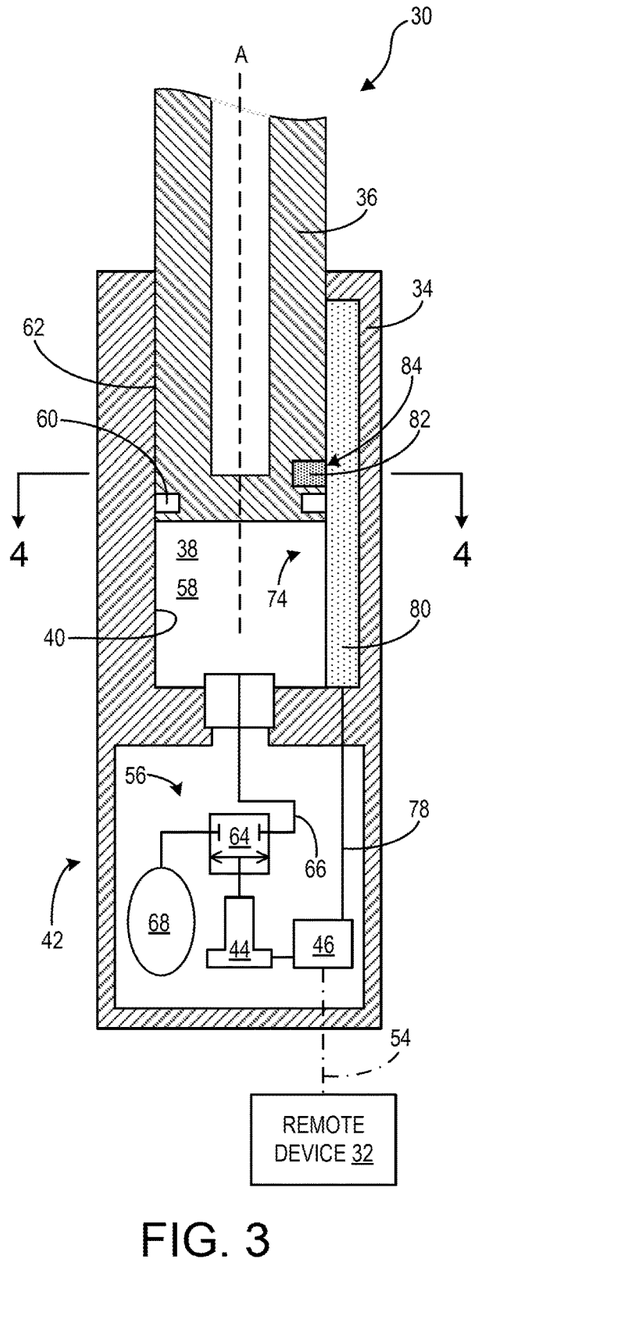
FIG. 3 is a schematic diagram of a bicycle telescopic apparatus according to a first embodiment of the present disclosure.
Figure 4:
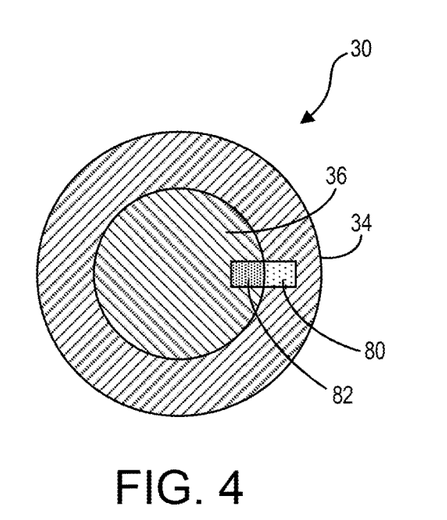
FIG. 4 is a schematic cross-sectional diagram of the bicycle telescopic apparatus according to FIG. 3, taken along the plane 4-4 in FIG. 3.

Turning to FIG. 3, the bicycle telescopic apparatus 30 according to a first embodiment is shown, and a cross-sectional view thereof is illustrated in FIG. 4. The first tube 34 is an outer tube that has a proximal end and distal end, which is opposite to the proximal end in a longitudinal direction of the first tube 34. The distal end of the first tube 34 is a lower end when the height-adjustable seatpost assembly 24 is received in the seat tube 22, as shown in FIG. 1. The first tube 34 has a receiving opening 38 into which the second tube 36 is inserted during assembly, and an inner surface 40. The receiving opening 38 is located at the proximal end of the first tube. The second tube 36 is an inner tube configured to be adjustably movable with respect to the first tube 34 in a longitudinal, or axial, direction of the bicycle telescopic apparatus 30, which is defined by a longitudinal center axis A indicated by the dashed line. Thus, the first tube 34 functions as a cylinder and the second tube 36 functions as a piston. However, in some embodiments, the first tube 34 and the second tube 36 cannot slide relative to one another unless the bicycle telescopic apparatus 30 is in an unlocked state as discussed further below. Further, one of the first tube 34 and the second tube 36 can be fixed with respect to the frame 12. The first tube 34 and the second tube 36 are preferably made of rigid material such as steel, aluminum alloy, or carbon reinforced material.

The bicycle telescopic apparatus 30 includes a positioning structure 42 to control the relative positional relationship between the first tube 34 and the second tube 36. The positioning structure 42 includes an electrical actuator 44, for example, as shown schematically in FIG. 3, to adjustably position the second tube 36 relative to the first tube 34 in the longitudinal direction. The electrical actuator 44 is depicted as being located in the first tube 34; however, it will be appreciated that it alternatively may be positioned in the second tube 36.

The bicycle telescopic apparatus 30 of FIG. 3 further includes a controller 46 in communication with the electrical actuator 44. The controller 46 is configured to control the electrical actuator 44 to position the second tube 36 relative to the first tube 34 at a predetermined relative position. As discussed below and shown in FIG. 5, the controller 46 includes microprocessor, such as a central processing unit (CPU) 48, and a motor driver 50 that drives an electric motor 52 of the electrical actuator 44. The controller 46 is additionally in communication with the remote device 32, and the remote device 32 is configured to transmit a control signal to the controller 46 to control the positioning structure 42.

In the embodiment of FIG. 3, the positioning structure 42 includes a hydraulic positioning structure 56, for example. The hydraulic positioning structure 56 can be located in at least one of the first tube 34 and the second tube 36. A chamber is formed between the first tube 34 and the second tube 36 when the second tube 36 is inserted into the receiving opening 38 of the first tube 34. In the bicycle telescopic apparatus 30 of FIG. 3, the chamber is filled with non-compressible fluid such as hydraulic fluid, which can be oil, and is thus configured as a hydraulic chamber 58. A proximal end of the hydraulic chamber 58 is defined by the second tube 36 and is sealed by a seal 60 fitted to an outer surface 62 of the second tube 36. The seal 60 is annular and is formed of resilient material such as rubber. Other seals, such as a dust seal, for example, can be employed to prevent dust from entering the receiving opening 38.

The hydraulic positioning structure 56 includes a valve 64 to open and close a hydraulic passage 66 between the hydraulic chamber 58 and an accumulator. The accumulator may be configured as an air chamber 68 that includes a compressible fluid, such as an air, to apply an upward bias on the second tube 36 when the valve 64 is in an open state, as described below. The electrical actuator 44 includes an electric motor 52 that can be coupled to the valve 64 to cause the valve 64 to open and close. Alternatively, the electrical actuator 44 can include a solenoid to open and close the valve 64.

In the embodiment illustrated in FIG. 3, the controller 46 controls the electrical actuator 44 to close the valve 64 at the predetermined relative position. When the valve 64 is in a closed state (i.e., is locked), as shown in FIG. 3, the first tube 34 and the second tube 36 cannot move with respect to one another. However, when the valve 64 is in an open state (i.e., is unlocked), hydraulic fluid is allowed to flow between the hydraulic chamber 58 and the air chamber 68, and the first tube 34 and the second tube 36 can move relative to one another, which allows the relative positional relationship between the first tube 34 and the second tube 36 to be adjusted. Alternatively, as discussed below, the electrical actuator 44 may be a motor-driven positioning mechanism that can be employed to drive one of the first tube 34 and the second tube 36 to move longitudinally with respect to the other of the first tube 34 and the second tube 36 according to electronic instructions signals.

The bicycle telescopic apparatus 30 of FIG. 3 further includes a memory 70 disposed on one of the first tube 34, the second tube 36, and the remote device 32. As described below and shown in FIG. 5, the memory 70 is configured to store setting information 72 for a predetermined relative position of the first tube 34 and the second tube 36. In the embodiment illustrated in FIG. 3, the controller 46 is configured to communicate wirelessly with the remote device 32, as indicated by a dashed dot line 54. Alternatively, the controller 46 and the remote device 32 may be directly wired to communicate with each other by a cable or the like.

A position sensor 74 of the bicycle telescopic apparatus 30 is configured to detect the predetermined relative position between the first tube 34 and the second tube 36 in the longitudinal direction of the bicycle telescopic apparatus 30. Referring to FIG. 3, the position sensor 74 is at least partially disposed in one of the first tube 34 and the second tube 36, and may be electrically coupled to the controller 46 by a detector wire 78, for example. In the embodiment illustrated in FIGS. 3 and 4, the position sensor 74 includes a first detector part 80, and a second detector part 82. The first detector part 80 is located on one of the first tube 34 and the second tube 36, and the second detector part 82 is located on the other of the first tube 34 and the second tube 36. In the embodiment illustrated in FIG. 3, the first detector part 80 is located on the first tube 34 and the second detector part 82 is located on the second tube 36; however, this arrangement can be reversed. Alternatively, in a second embodiment described below, a position sensor 274 may include a pressure sensor to detect a pressure of an air chamber biasing the second tube 36 relative to the first tube 34 in an extending direction.

As shown in FIG. 4, the facing surfaces of the first detector part 80 and the second detector part 82 conform to the circular shapes of the first tube 34 and the second tube 36, and a point of connection between the first detector part 80 and the second detector part 82 may be defined as a detecting point 84, for example. Therefore, in this embodiment, the detecting point 84 is defined as a point of contact between the first detector part 80 and the second detector part 82. However, the point of connection between the first detector part 80 and the second detector part 82 is not limited to a point of direct contact. For example, if the position sensor 74 includes a magnetostrictive linear sensor, the connecting point includes a gap between the first detector part 80 and the second detector part 82.

In the embodiment illustrated in FIG. 3, the position sensor 74 has an elongated shape extending in the longitudinal direction. The first detector part 80 of the position sensor 74 has an elongated shape, the longitudinal direction of which is parallel to the longitudinal center axis A. In the embodiment of FIG. 3, the second detector part 82 is located between the seal 60 and the receiving opening 38 of the first tube 34 in the longitudinal direction. Further, in the embodiment of FIG. 3, the second detector part 82 is located on the outer surface 62 of the second tube 36. However, it is possible to locate the second detector part 82 at other locations.

The position sensor 74 can be any of several known linear position sensors. For example, in the embodiment of FIG. 3, the position sensor 74 includes a potentiometer. The first detector part 80 is configured as an elongated variable resistance member, and the second detector part 82 is configured as a sliding element, or brush, that makes electrical contact with the variable resistance member. The location of the brush with respect to the elongated resistance member can be determined in a known manner. Similarly, a digital potentiometer, which mimics an analog potentiometer, can be employed. In addition, a magnetostrictive linear sensor can be employed as the position sensor 74. In this case, the first detector part 80 is a waveguide member, and the second detector part 82 is a magnet. The relative position between the magnet and the waveguide member can be determined in a known manner. In a magnetostrictive linear sensor, contact between the first detector part 80 and the second detector part 82 is not required.

During an adjusting operation of the height of the bicycle telescopic apparatus, the position sensor 74 outputs a signal to position the second tube 36 relative to the first tube 34 at the predetermined relative position to the controller 46 in response to a detection of the predetermined relative position. The position sensor 74 may communicate this signal to the controller 46 by the detector wire 78, as described above. As such, the controller 46 can receive relative position information from the position sensor 74 and can output that information as a signal to, for example, the remote device 32 and/or the electrical actuator 44. The controller 46 can include an analog to digital converter 86 depending on the type of the position sensor 74, as shown in FIG. 5.

Figure 5:
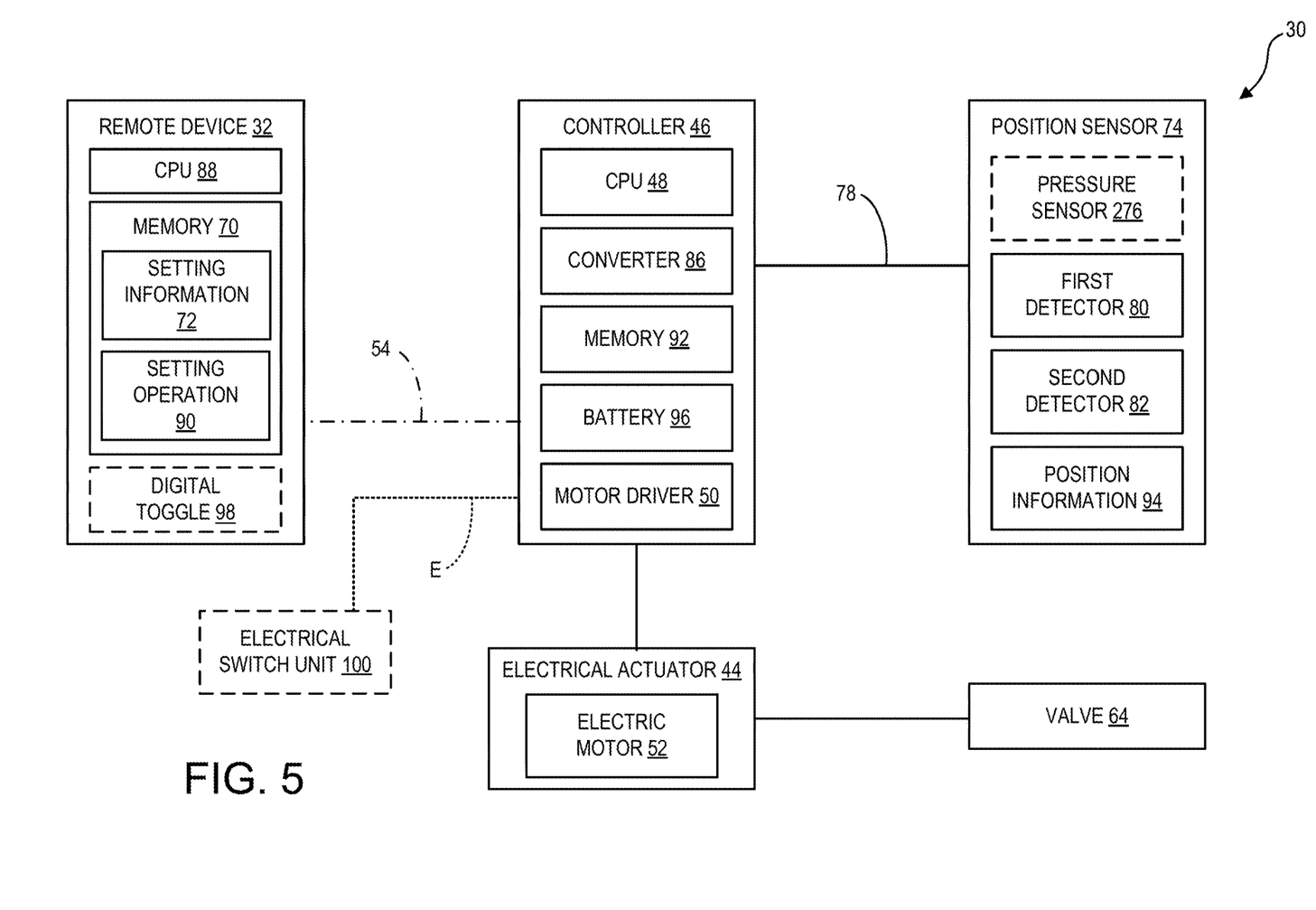
FIG. 5 is a schematic block diagram of the communication between a remote device, a controller, and a positioning structure of a bicycle telescopic apparatus.

A schematic block diagram of the communication between the remote device 32, the controller 46, and the electrical actuator 44 and the position sensor 74 included in the positioning structure 42 of the bicycle telescopic apparatus 30 is illustrated in FIG. 5. With reference to FIG. 1, the remote device 32 may be configured as a computing device such as a mobile phone, electronic tablet, or the like, and it may be mounted, for example, on the handlebar 20, where it can be manipulated by a user. The remote device 32 includes a CPU 88 and memory 70 that is configured to store setting information 72 for predetermined relative positions of the first tube 34 and the second tube 36 of the bicycle telescopic apparatus 30. As described above, in some embodiments the memory 70 may disposed on the first tube 34 or the second tube 36, rather than the remote device 32. The setting information 72 is configured to be changed via an electrical setting operation 90, and the controller 46 is configured to communicate with the remote device 32 to establish the electrical setting operation 90. A user may adjust the length of the bicycle telescopic apparatus 30 to a desired setting, for example, by operating a digital toggle 98 included in the remote device 32. The communication between the remote device 32 and the controller 46 may be wireless, as indicated by the dashed dot line in FIG. 5. Additionally or alternatively, the electrical switch unit 100 may be used to select the desired setting of the bicycle telescopic apparatus 30. As discussed below, the controller 46 controls the motor driver 50 to drive the electric motor 52 of the electrical actuator 44 to open and close the valve 64. The electrical switch unit 100 may be operated to send an electrical signal E to the controller 46 to initiate the opening or closing of the valve 64, as indicated by the dotted line in FIG. 5.

As further illustrated in FIG. 5, the controller 46 of the bicycle telescopic apparatus 30 includes a microprocessor such as the CPU 48 mentioned above, and a memory 92. The CPU 48 processes position information 94 of the bicycle telescopic apparatus 30 read from the position sensor 74, and the memory 92 of the controller 46 stores programs and data related to the setting information 72 and position information 94. The position information 94 from the position sensor 74 can be applied to the setting information 72 to adjust the length of the bicycle telescopic apparatus 30 to a selected predetermined relative position. The controller 46 can include additional programs for performing tasks such as calibrating the position sensor 74. Further, the controller 46 can include a network interface if a communication network is employed on the bicycle 10.

The controller 46 additionally includes the motor driver 50 that drives the electric motor 52 of the electrical actuator 44. A power source, illustrated as a battery 96 in the embodiment of FIG. 5, is provided in the controller 46 to power the electric motor 52 of the electrical actuator 44. The electric motor 52 of the electrical actuator 44 may be configured to open and close the valve 64 when the bicycle telescopic apparatus 30 includes the hydraulic positioning structure 56 described above. Alternatively, in a third embodiment described below, the electric motor 52 of the electrical actuator 44 may be configured to power a drive screw 364 of a screw-drive system, for example, when the bicycle telescopic apparatus (330 in FIG. 8) includes a mechanical positioning structure (356 in FIG. 8). As described above, in some embodiments the controller 46 can include an analog to digital converter 86. Accordingly, if the position sensor 74 produces an analog signal, the controller 46 can convert the signal from the position sensor 74 to a digital signal.

As illustrated in FIG. 5, the controller 46 is in further communication with the position sensor 74. As described above in the first embodiment, the position sensor 74 includes the first detector part 80 and the second detector part 82 to detect the relative position of the first tube 34 and the second tube 36, and provides this position information 94 to the controller 46. In some embodiments, such as described below and shown in FIG. 7, in a bicycle telescopic apparatus 230 that includes the hydraulic positioning structure 56, the position sensor 74 may alternatively include a pressure sensor 276 to detect a pressure the air chamber 68 biasing the second tube 36 relative to the first tube 34 in an extending direction, as indicated by the dashed lines.

Figure 6:
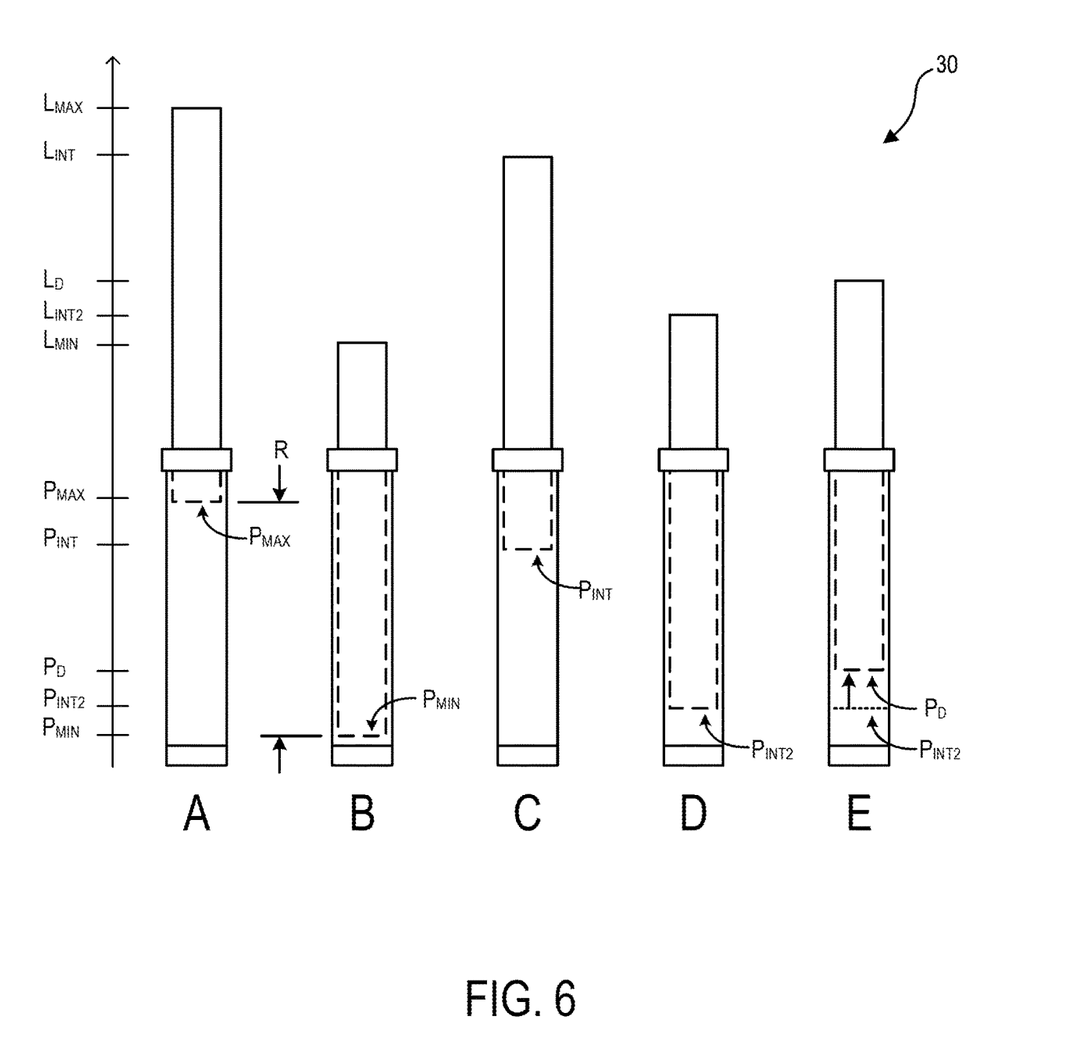
FIG. 6 is a schematic diagram of relative positions of the bicycle telescopic apparatus according to the present disclosure.

FIG. 6 illustrates various embodiments of the relative position of the bicycle telescopic apparatus 30. In any of the embodiments described herein, the position sensor 74 detects at least two relative positions of the first tube 34 and the second tube 36. Setting information 72 corresponding to these relative positions may be programmed into the controller 46 by a user to establish preferred settings for different road conditions, for example. Exemplary settings of a maximum length position $P_{MAX}$, a minimum length position $P_{MIN}$, first and second intermediate length positions $P_{INT}$, $P_{INT2}$, and a desired length position $P_D$ are shown on the vertical graph, with corresponding seatpost lengths $L_{MAX}$, $L_{MIN}$, $L_{INT}$, $L_{INT2}$, and $L_D$. Accordingly, as illustrated at A and B in FIG. 6, the predetermined relative position corresponds to at least one of the maximum length position $P_{MAX}$ and the minimum length position $P_{MIN}$ of the bicycle telescopic apparatus 30, as set by the user. The controller 46 is configured to set the predetermined relative position from one of the at least two relative positions. In some instances, it may be desired to alter the maximum length position $P_{MAX}$ and the minimum length position $P_{MIN}$ to accommodate variations in the road conditions, or a different user, for example. In these cases, the maximum length position $P_{MAX}$ and the minimum length position $P_{MIN}$ are changed via the electrical setting operation 90. As such, an adjustable length range R of the bicycle telescopic apparatus 30 is variable. In the embodiments provided herein, the adjustable length range R is greater than or equal to 50 mm and less than or equal to 300 mm, and the adjustable length range R is illustrated in FIG. 6 at A and B as the maximum range R between $P_{MAX}$ and $P_{MIN}$. It will be appreciated that the adjustable length range R is the total distance ($P_{MAX}$ minus $P_{MIN}$) over which adjustability is provided, and does not represent a range for the total length $L_{MAX}$ of the seatpost.

It may be desirable for a user to set the bicycle telescopic apparatus 30 at the intermediate position $P_{INT}$ between the maximum and minimum length positions, as shown in FIG. 6 at C. As such, it is possible for a user to program one or more additional positions into the controller 46 such that the predetermined relative position corresponds to the intermediate length position $P_{INT}$ arranged between the maximum length position $P_{MAX}$ and the minimum length position $P_{MIN}$ of the bicycle telescopic apparatus 30. Additionally or alternatively, the settings for the predetermined relative position may be configured to include more than two intermediate length positions, as illustrated in FIG. 6 at C and D as $P_{INT}$ and $P_{INT2}$.

In some cases, the user may desire a position that is different from those entered into the memory 70 of the bicycle telescopic apparatus 30. Such a position may be temporary or experimental, for example. To allow for such adjustments, the memory 70 is configured to selectably bypass the predetermined relative position that corresponds to the intermediate length position $P_{INT}$ via the electrical setting operation 90. To achieve these adjustments, the controller 46 is configured to bypass the intermediate length position $P_{INT}$ in response to a receipt of an alternate control signal from a remote device 32. For example, a user may set and select a predetermined relative position, such as the second intermediate length position $P_{INT2}$ using the electrical setting operation 90 and setting information 72 stored in memory 70 on the remote device 32. As described above with reference to FIG. 5, the remote device 32 is in communication with the controller 46, and the controller 46 is in further communication with the position sensor 74 of the bicycle telescopic apparatus 30. If the user's desired length position $P_D$ is not at a second intermediate length position $P_{INT2}$, the user may enter a command on the remote device 32 to direct the controller 46 to move the bicycle telescopic apparatus 30 to a different length position, as detected by the position sensor 74. For example, as discussed below with reference to FIG. 9, the user may actuate the digital toggle 98 to adjust the length of the bicycle telescopic apparatus 30. Alternatively, as discussed below with reference to FIG. 10, the user may actuate the electrical switch unit 100 to adjust the length of the bicycle telescopic apparatus 30.

An example scenario of such fine-tuning is schematically illustrated in FIG. 6 at E, in which the second intermediate length position $P_{INT2}$ corresponds to the setting information 72 entered during the electrical setting operation 90, but the desired length position $P_D$ of the bicycle telescopic apparatus 30 is slightly higher than the second intermediate length position $P_{INT2}$. The command on the remote device 32 could be in the form of, for example, or the digital toggle 98 that is programmed to increase or decrease the length of the bicycle telescopic apparatus 30 when actuated by a user. Additionally or alternatively, the electrical switch unit 100 may be operated to select a setting for the length of the bicycle telescopic apparatus 30. As such, it is possible to accurately control the length position of the bicycle telescopic apparatus 30 at much smaller length increments than what could typically be achieved by user manipulation of a conventionally adjustable bicycle telescopic apparatus assembly.

Figure 7:
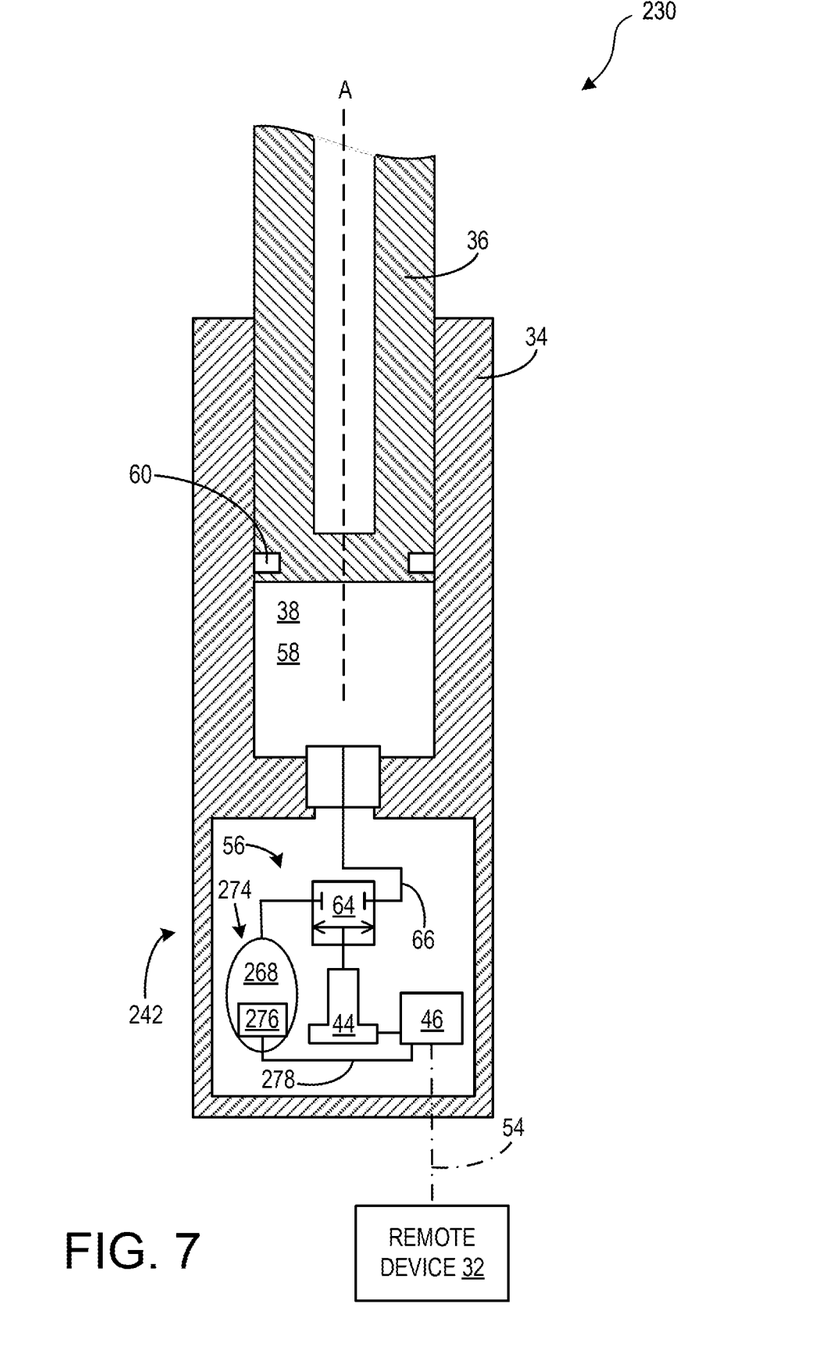
FIG. 7 is a schematic diagram of a bicycle telescopic apparatus according to a second embodiment of the present disclosure.

FIG. 7 shows another embodiment of a bicycle telescopic apparatus 230. The reference numbers used in the description of FIG. 3 and subsequent embodiments may be the same or similar to those used in the description of FIG. 3 if to identify parts that are the same or similar to those described in connection with the embodiment of FIG. 3.

The embodiment of FIG. 7 is generally similar to that of FIG. 3, except that the position sensor 274 includes a pressure sensor 276, as shown schematically in FIG. 7. Like the embodiment illustrated in FIG. 3, the position sensor 274 of the bicycle telescopic apparatus 230 is configured to detect the predetermined relative position between the first tube 34 and the second tube 36 in the longitudinal direction along axis A of the bicycle telescopic apparatus 230. In the embodiment illustrated in FIG. 7, the position sensor 274 includes a pressure sensor 276 configured to detect a pressure of an air chamber 268 biasing the second tube 36 relative to the first tube 34 in an extending direction. The pressure sensor 276 may be disposed in the air chamber 268, and the pressure of the air chamber 268 may be communicated to the controller 46 as part of a feedback mechanism that regulates the opening of the valve 64. Accordingly, the pressure sensor 276 may be electrically coupled to the controller 46 by a detector wire 278, for example.

Figure 8:
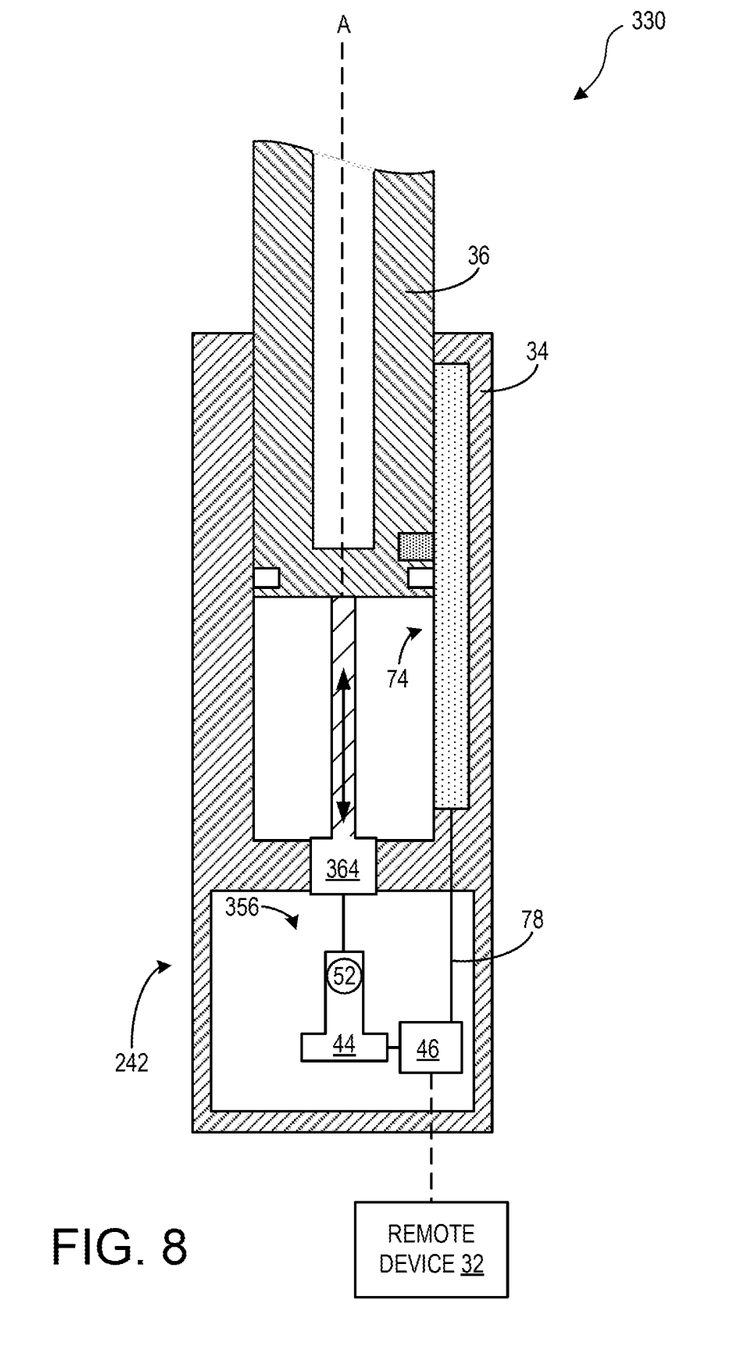
FIG. 8 is a schematic diagram of a bicycle telescopic apparatus according to a third embodiment of the present disclosure.

In the embodiments of FIGS. 3 and 7, the opening and closing of a valve is controlled by the electric motor 52 included in the electrical actuator 44 and electrically coupled to the valve 64 to control the length of the bicycle telescopic apparatus 30, 230 in a hydraulic manner. FIG. 8 illustrates another embodiment of a bicycle telescopic apparatus 330. The embodiment of FIG. 8 is generally similar to that of FIGS. 3 and 7, except that the bicycle telescopic apparatus 330 is configured to have a positioning structure 342 that is operated mechanically, such as by a motor-driven mechanism, rather than hydraulically. The reference numbers used in the description of FIGS. 3 and 7 may be the same or similar to those used in the description of FIG. 8 if to identify parts that are the same or similar to those described in connection with the embodiment of FIGS. 3 and 7.

In the illustrated embodiment, the positioning structure 342 is configured as a mechanical positioning structure 356 in which a drive screw 364 is controlled by the electric motor 52 included in the electrical actuator 44 and electrically coupled to the drive screw 364. The electrical actuator 44 powers the drive screw 364 to mechanically move one of the first tube 34 and the second tube 36 in a longitudinal direction along axis A with respect to the other of the first tube 34 and the second tube 36. As described above, the motor driver 50 of the controller 46 may drive the electrical motor 52 of the electrical actuator 44. In the embodiment of FIG. 8, the electrical actuator 44 moves the drive screw 364, rather than a position of a valve, according to a predetermined relative position. Similar to the other embodiments described herein, the position sensor 74 can detect the relative position of the bicycle telescopic apparatus 330, and position information is communicated to the controller 46 that is electrically coupled to the position sensor 74 by the detector wire 78. In addition to the illustrated drive screw system, other known mechanical positioning structures can be employed to adjust the length of the bicycle telescopic apparatus 330. For example, a ratchet mechanism, which is released or engaged by the telescopic apparatus operating device 330, can be employed to lock and release the bicycle telescopic apparatus 330, and a mechanical spring can be provided to urge the bicycle telescopic apparatus 330 in a longitudinal direction.

Figure 9:
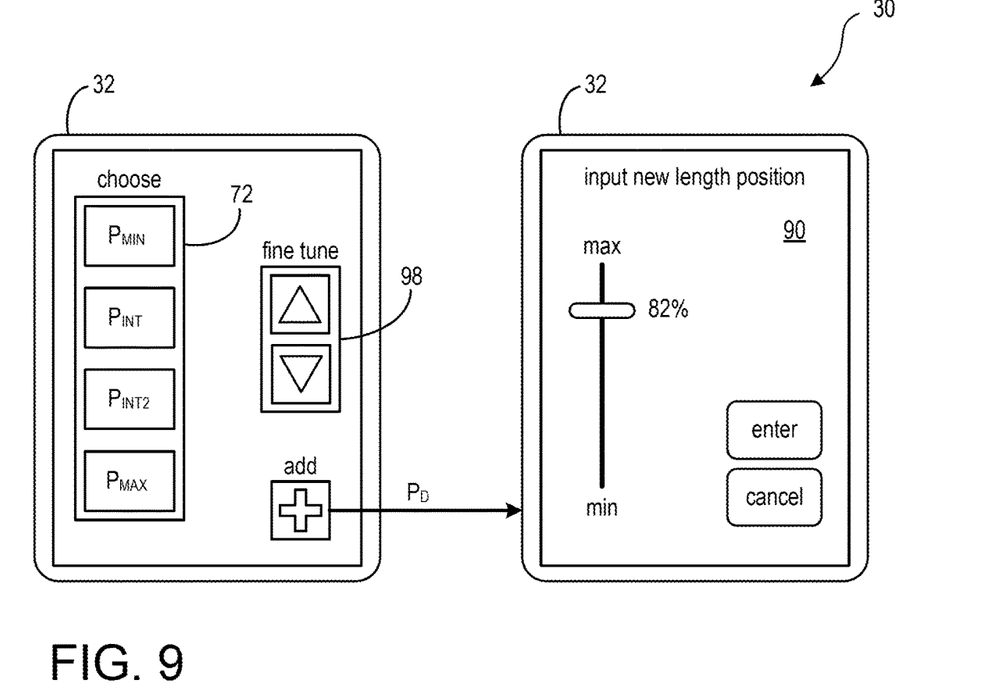
FIG. 9 is a schematic diagram of a remote device of the bicycle telescopic apparatus according to the present disclosure.

Adjustment of the bicycle telescopic apparatus 30 with the remote device 32 is schematically illustrated in FIG. 9. With the embodiments described above, a user may conveniently adjust the length of the bicycle telescopic apparatus 30, even while riding if desired, between a plurality of predetermined relative positions, and may even fine tune the position of the bicycle telescopic apparatus 30 further by adjusting the length up or down from one of the predetermined relative positions. As discussed above, multiple predetermined relative positions may be entered via the electrical setting operation 90. These settings are stored on the remote device 32 as setting information 72, and accessed by the controller 46 in tandem with position information 94 from the position sensor 74 to adjust the length of the bicycle telescopic apparatus 30 to the selected predetermined relative position. Examples of predetermined relative positions are provided above with reference to FIG. 6, and shown in FIG. 9 as $P_{MIN}$, $P_{INT}$, $P_{INT2}$, and $P_{MAX}$.

To adjust the length of the bicycle telescopic apparatus 30 to a position that is different from those entered into the memory 70, a user may actuate the digital toggle 98, depicted in the left panel of FIG. 9, to provide an alternate control signal to the controller 46 to bypass the selected predetermined relative position and fine tune the position of the bicycle telescopic apparatus 30 to a desired length position $P_D$. If the position $P_D$ is temporary or experimental, the user may choose to retain the current setting information 72 for the predetermined relative positions. However, if the user wishes to save the position $P_D$ as a new predetermined relative position, they may choose to perform the electrical setting operation 90 to add data for position $P_D$ to the setting information 72, as depicted by the "add" function of the left panel of FIG. 9 and the arrow that indicates adding this information to the right panel of FIG. 9 in an electrical setting operation 90. The graphical user interface of the electrical setting operation 90 on the remote device may additionally provide real-time information about the currently selected position of the bicycle telescopic apparatus 30, or about the newly selected position during the electrical setting operation 90. An example of such information may be an indication of the current position expressed as a percentage of the maximum length of the bicycle telescopic apparatus 30, as illustrated by the sliding control and "82%" in FIG. 9.

As in the first and second embodiments described above with reference to FIGS. 3 and 7, a user may select a predetermined relative position on the remote device 32, which communicates with the controller 46 to open or close the valve 64. When the valve 64 is open, the user may sit down on the seat 28 to apply a downward biasing force that fully depresses the seatpost 26. The user may then remove their weight from the seat 28 to release the downward biasing force and operate the remote device 32 to progressively allow the seatpost 26 to rise to each of the predetermined relative positions indicated above. For example, as shown in FIG. 9, once the seatpost 26 is lowered, the user may select a predetermined relative position displayed in the setting information 72 on the remote device 32 to cause the seatpost 26 to rise to the selected predetermined relative position. When the desired predetermined relative position is higher than the current predetermined relative position, the user may simply remove their weight from the seat 28 and operate the remote device 32 to allow the seatpost 26 to rise, without first fully depressing the seatpost 26 to the lowest position. It will be appreciated that, when the bicycle telescopic apparatus 30 includes the mechanical positioning structure 356 described above in the third embodiment with reference to FIG. 8, the seatpost 26 may be mechanically lowered without the user's weight providing a downward biasing force.

Figure 10:
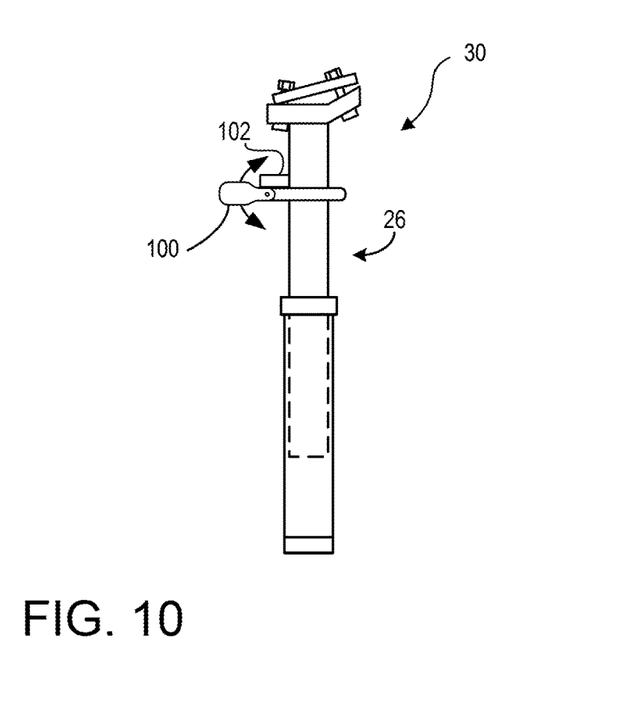
FIG. 10 is a schematic diagram of an electrical switch unit of the bicycle telescopic apparatus according to the present disclosure.

Additionally or alternatively to performing a touch input on the remote device 32, the electrical switch unit 100 may be operated to adjust the length of the bicycle telescopic apparatus 30, as shown in FIG. 10. As illustrated, the electrical switch unit 100 may be mounted on the seatpost 26 of the bicycle 10 for the convenience of the user. In the illustrated embodiment, the electrical switch unit 100 is mounted on the seatpost 26 adjacent the left handle; alternatively, the electrical switch unit 100 may be mounted in another location, such as on the handlebar 20. A wireless communications unit 102 is provided on the electrical switch unit 100 and is configured to communicate wirelessly with the controller 46 and/or the remote device 32. To adjust the length of the bicycle telescopic apparatus 30 to a predetermined relative position, the user may press on the electrical switch unit 100 in an upward or downward motion, as indicated by the bidirectional arrow in FIG. 10. To bypass the selected predetermined relative position and fine tune the position of the bicycle telescopic apparatus 30 to a desired length position $P_D$, the user may perform a shorter operation on the electrical switch unit 100, such as a tap. As such, the electrical switch unit 100 of the bicycle telescopic apparatus 30 may be likened to the functionality of an electrically operated car window in which a firm touch on a controlling button causes the window to fully open or close, whereas a shorter, tap-like touch on the controlling button causes the window to move upward or downward in a relatively smaller increment.

In the first and second embodiments described herein, the electrical switch unit 100 may send an electrical signal E to the controller 46 to open or close the valve 64. In the third embodiment described herein, the electrical switch unit 100 may send an electrical signal E to the controller 46 to power the drive screw 364 to mechanically raise or lower the bicycle telescopic apparatus 30. In the illustrated embodiment, the electrical switch unit 100 is depicted as a lever, but it will be appreciated that the electrical switch unit 100 may be alternatively configured as a button or another appropriate control apparatus.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two elements, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A bicycle telescopic apparatus comprising:
   a first tube;
   a second tube telescopically received in the first tube and configured to be adjustably movable with respect to the first tube in a longitudinal direction of the bicycle telescopic apparatus;
   a positioning structure including an electrical actuator to adjustably position the second tube relative to the first tube in the longitudinal direction;
   a memory configured to store setting information for a predetermined relative position of the first tube and the second tube, the predetermined relative position in the setting information being configured to be changed via an electrical setting operation in accordance with at least an input to a remote device; and
   a controller configured to control the electrical actuator to, responsive to receiving a first control signal from the remote device, position the second tube relative to the first tube at the predetermined relative position, wherein
   the controller is configured to, responsive receiving a second control signal from the remote device, modify a position of the second tube relative to the first tube to a desired position bypassing the predetermined relative position; and
   responsive to receiving a user input, setting information corresponding to the desired position is configured to be programmed into the memory of the controller in accordance with preferred settings of a user.

2. The bicycle telescopic apparatus of claim 1, wherein the positioning structure includes a hydraulic positioning structure including a valve to open and close a hydraulic passage,
   the controller controls the electrical actuator to close the valve at the predetermined relative position.

3. The bicycle telescopic apparatus of claim 1, further comprising:
   an electrical switch unit configured to be operated by the user to output the first control signal.

4. The bicycle telescopic apparatus of claim 1, further comprising:
   a digital toggle configured to be operated by the user to output the second control signal.

5. The bicycle telescopic apparatus of claim 1, wherein the bicycle telescopic apparatus further comprises a position sensor configured to detect the predetermined relative position of the first tube and the second tube, and
   the position sensor outputs a signal to position the second tube relative to the first tube at the predetermined relative position to the controller in response to a detection of the predetermined relative position.

6. The bicycle telescopic apparatus of claim 5, wherein the position sensor detects at least two relative positions of the first tube and the second tube, and the controller is configured to set the predetermined relative position from one of the at least two relative positions.

7. The bicycle telescopic apparatus of claim 5, wherein the setting information includes the at least two relative positions of the first tube and the second tube detected by the position sensor, and the at least two relative positions of the first tube and the second tube detected by the position sensor are programmed into the memory of the controller via the user input in accordance with the preferred settings of the user.

8. The bicycle telescopic apparatus of claim 5, wherein the position sensor is at least partially disposed in one of the first tube and the second tube.

9. The bicycle telescopic apparatus of claim 8, wherein the position sensor has an elongated shape extending in the longitudinal direction.

10. The bicycle telescopic apparatus of claim 8, wherein the position sensor includes a pressure sensor configured to detect a pressure of an air chamber biasing the second tube relative to the first tube in an extending direction.

11. The bicycle telescopic apparatus of claim 1, wherein the memory is disposed on one of the first tube, the second tube.

12. The bicycle telescopic apparatus of claim 11, wherein the controller is configured to communicate with the remote device to establish the electrical setting operation.

13. The bicycle telescopic apparatus of claim 12, wherein the controller is configured to communicate wirelessly with the remote device.

14. The bicycle telescopic apparatus of claim 1, wherein the predetermined relative position corresponds to at least one of a maximum length position and a minimum length position of the bicycle telescopic apparatus such that an adjustable length range of the bicycle telescopic apparatus is variable.

15. The bicycle telescopic apparatus of claim 14, wherein the maximum length position and the minimum length position are changed via the electrical setting operation.

16. The bicycle telescopic apparatus of claim 14, wherein the adjustable length range is greater than or equal to 50 mm and less than or equal to 300 mm.

17. The bicycle telescopic apparatus of claim 1, wherein the predetermined relative position corresponds to an intermediate length position arranged between a maximum length position and a minimum length position of the bicycle telescopic apparatus.

18. The bicycle telescopic apparatus of claim 17, wherein the predetermined relative position includes more than two intermediate length positions.

19. The bicycle telescopic apparatus of claim 17, wherein the memory is configured to selectably bypass the predetermined relative position that corresponds to the intermediate length position via the electrical setting operation.

20. The bicycle telescopic apparatus of claim 17, wherein the controller is configured to bypass the intermediate length position in response to a receipt of an alternate control signal from the remote device.

* * * * *